United States Patent
Parry

(10) Patent No.: US 7,103,182 B2
(45) Date of Patent: Sep. 5, 2006

(54) PUBLIC ENCRYPTION OF A STORED PRINT JOB

(75) Inventor: Travis J. Parry, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 845 days.

(21) Appl. No.: 09/812,047

(22) Filed: Mar. 19, 2001

(65) Prior Publication Data

US 2002/0131593 A1 Sep. 19, 2002

(51) Int. Cl.
H04L 15/34 (2006.01)
H04L 9/00 (2006.01)
G09C 3/08 (2006.01)

(52) U.S. Cl. .................. 380/51; 713/165; 713/193; 709/206; 709/207; 358/1.15

(58) Field of Classification Search ............... 380/51; 713/200–202, 193, 155, 165; 358/1.15, 1.2, 358/1.6, 1.16; 705/51, 64; 709/206, 207
See application file for complete search history.

(56) References Cited

U.S. PATENT DOCUMENTS

| | | | |
|---|---|---|---|
| 5,115,326 A | 5/1992 | Burgess et al. | 358/440 |
| 5,715,403 A | 2/1998 | Stefik | 395/244 |
| 5,905,801 A * | 5/1999 | Serinken | 380/51 |
| 5,926,550 A * | 7/1999 | Davis | 713/176 |
| 5,970,218 A * | 10/1999 | Mullin et al. | 358/1.15 |
| 6,181,436 B1 * | 1/2001 | Kurachi | 358/1.15 |
| 6,378,070 B1 * | 4/2002 | Chan et al. | 713/155 |
| 6,542,261 B1 * | 4/2003 | McGraw | 358/434 |
| 6,625,642 B1 * | 9/2003 | Naylor et al. | 709/206 |
| 6,688,230 B1 * | 2/2004 | Goh et al. | 101/484 |
| 6,694,430 B1 * | 2/2004 | Zegelin et al. | 713/160 |
| 6,711,677 B1 * | 3/2004 | Wiegley | 713/151 |
| 6,744,528 B1 * | 6/2004 | Picoult et al. | 358/1.15 |
| 6,748,471 B1 * | 6/2004 | Keeney et al. | 710/220 |
| 6,816,274 B1 * | 11/2004 | Silverbrook et al. | 358/1.15 |
| 6,825,945 B1 * | 11/2004 | Silverbrook et al. | 358/1.15 |
| 6,862,583 B1 * | 3/2005 | Mazzagatte et al. | 705/64 |
| 2001/0037462 A1 * | 11/2001 | Bengtson | 713/201 |

FOREIGN PATENT DOCUMENTS

EP 0935182 A1 * 8/1999
EP 1071254 A2 * 1/2001

* cited by examiner

Primary Examiner—Kim Vu
Assistant Examiner—Beemnet W Dada

(57) ABSTRACT

A system and method for sending a print job to a preselected recipient. The method includes encrypting a data stream received in a first peripheral device; and transmitting the encrypted data stream from the first peripheral device to a second peripheral device.

5 Claims, 2 Drawing Sheets

US 7,103,182 B2

PUBLIC ENCRYPTION OF A STORED PRINT JOB

BACKGROUND OF THE INVENTION

1. Field of the Invention

This invention relates to printers and, in particular, to a system and method for transmitting a secure print job to a selected recipient.

2. Related Art

Today's business environments generally include networked systems having a well-known architecture in which a number of users share resources. In a large facility it is typical to find many computers and printers connected to a network. Accordingly, the practice of transmitting print jobs from a computer to a peripheral device or between various multifunctional peripheral devices is becoming an increasingly popular and widespread practice.

It may be the case that others on the network may have access to a stored print job or at least the capability to intercept the print job as it is being transmitted between devices. Understandably, if an unauthorized person obtains access to information that is meant to remain confidential, such as personnel records regarding benefits and pay, the result can be serious.

SUMMARY

The present invention provides a system and method for securely storing and transmitting print jobs. The method is achieved in a networked system having a plurality of host computers and peripheral devices. The peripheral devices can have a printing function, an encoding function, memory for storing a plurality of encoded print jobs, an input device for manually inputting information into the peripheral device, and an output device for transmitting print jobs to hosts or other peripheral devices.

In one aspect of the present invention, a method is provided for sending a print job to a preselected recipient. The method includes encoding a data stream received in a first peripheral device; and transmitting the encoded data stream from the first peripheral device to a second peripheral device.

In another aspect of the present invention, a method is provided for transporting print jobs. The method includes initiating a print job on a host computer; encrypting the print job; and transmitting the encrypted print job from a first peripheral device to a second peripheral device.

In another aspect of the present invention, a method is provided for providing a secure print job. The method includes initiating a print job on a host computer; transmitting the print job to a first peripheral device; and thereafter encrypting the print job.

In another aspect of the present invention, a printing system is provided. The printing system includes a processor for receiving a data stream through a network. The system also includes an encryption module for converting the data stream from plain text to cipher text. The cipher text can then be placed in a sender module, which transmits the cipher text through the network to a preselected recipient.

This brief summary has been provided so that the nature of the invention may be quickly understood. A more complete understanding of the invention can be obtained by reference to the following detailed description of embodiments thereof in connection with the attached drawings.

DETAILED DESCRIPTION

Figure 1:
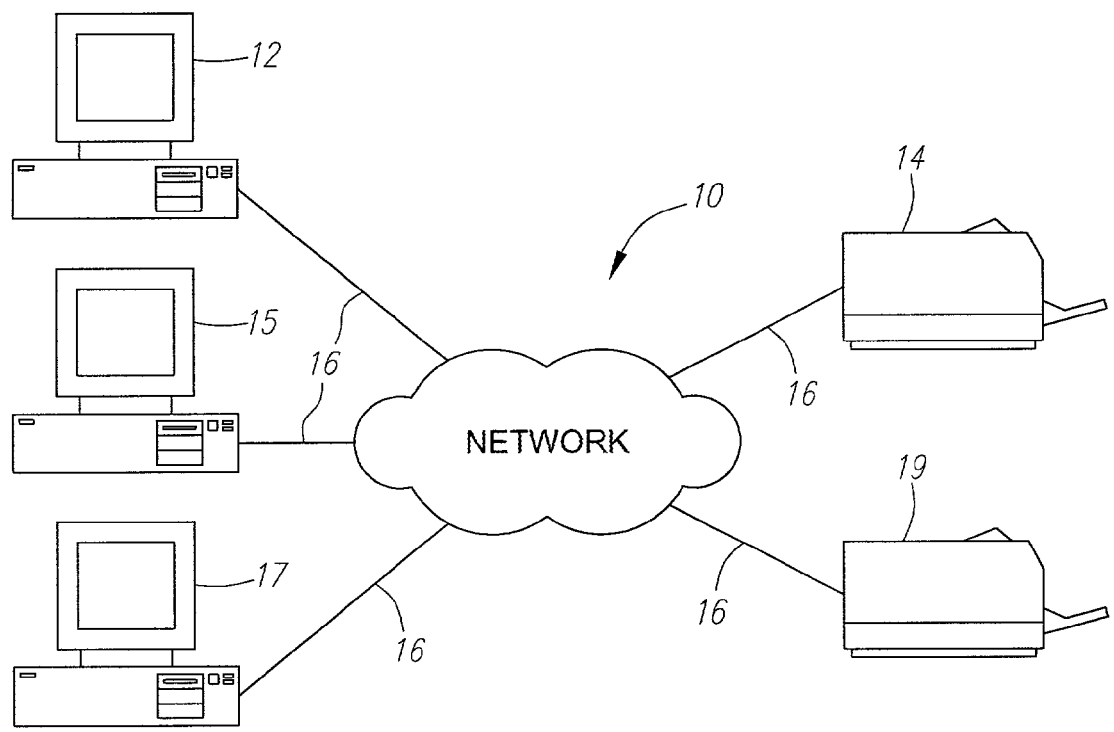
FIG. 1 is a simplified schematic illustration of a network in accordance with the present invention.

The detailed description that follows is presented largely in terms of processes and symbolic representations of operations performed by conventional computers and peripheral devices, such as file servers, printers, copiers, and the like.

The computers and peripheral devices may advantageously contain program logic or other substrate configuration representing data and instructions, which cause the computers and peripheral devices to operate in a specific and predefined manner, as described herein. The program logic may advantageously be implemented as one or more modules. The modules may advantageously be configured to reside on memory in the computers and peripheral devices and execute on the one or more processors. The modules include, but are not limited to, software or hardware components that perform certain tasks. Thus, a module may include, by way of example, components, such as, software components, processes, functions, subroutines, procedures, attributes, class components, task components, object-oriented software components, segments of program code, drivers, firmware, micro-code, circuitry, data, and the like.

The program logic is generally considered to be a sequence of processor-executed steps. These steps generally require manipulations of physical quantities. Usually, although not necessarily, these quantities take the form of electrical, magnetic, or optical signals capable of being stored, transferred, combined, compared, or otherwise manipulated. It is conventional for those of ordinary skill in the art to refer to these signals as bits, values, elements, symbols, characters, text, terms, numbers, records, files, or the like. It should be kept in mind, however, that these and some other terms should be associated with appropriate physical quantities for computer operations, and that these terms are merely conventional labels applied to physical quantities that exist within and during operation of the computer.

It should be understood that manipulations within the processor are often referred to in terms of adding, comparing, retrieving, playing, moving, searching, transmitting and the like, which are often associated with manual operations performed by a human operator. It is to be understood that no involvement of the human operator may be necessary, or even desirable. The operations described herein are machine operations performed in conjunction with the human operator or user that interacts with the computers and peripheral devices.

It should also be understood that the programs, modules, processes, methods, and the like, described herein are but an exemplary implementation and are not related, or limited, to any particular computer, apparatus, or computer language. Rather, various types of general purpose computing machines or devices may be used with programs constructed in accordance with the teachings described herein. Similarly, it may prove advantageous to construct a specialized apparatus to perform the method steps described herein by way of dedicated computer systems with hard-wired logic or programs stored in non-volatile memory, such as read-only memory (ROM).

Throughout this description, the preferred embodiment and examples shown should be considered as exemplars, rather than limitations on the apparatus and methods of the present invention.

FIG. 1, is a simplified diagram of a network 10 in accordance with the invention. Network 10 may be a Local Area Network (LAN), wide area network (WAN), or other Electronic mail (E-mail) system (hereinafter "network 10"), which may or may not use a communication system, such as the Internet I. In one embodiment, network 10 can include one host computer or workstation to a plurality of host computers or workstations, for example, host computers 12, 15 and 17, and one peripheral device to a plurality of peripheral devices, for example peripheral devices 14 and 19 coupled to one another via network communications lines 16 and/or Internet I. The descriptions of host computers and peripheral devices that follow, although directed to only one computer or peripheral device, are meant to describe all such computers and peripheral devices that may be found in network 10.

Host computer 12 is typically a computer of the type that is well known by those of ordinary skill in the art. Host computer 12 can execute an appropriate operating system, such as Linux, Unix, Microsoft® Windows® 95, Microsoft® Windows® 98, Microsoft® Windows® NT, Apple® MacOS®, IBM® OS/2®, and the like. Host computer 12 may advantageously be equipped with a network communication device, such as a network interface card, a modem, or other network connection device suitable for connecting to one or more networks, including the Internet. Network 10 may also include hubs, routers and other devices (not shown).

Peripheral device 14 can include a printing function, memory, which can be used for storing print jobs and a panel, keyboard or the like, that allows a walk-up user to manually enter information into peripheral device 14. In one embodiment, peripheral device 14 may be a printer, copy machine capable of obtaining jobs from host computer 12 on network 10, or any other type of multifunction peripheral device.

Figure 2:
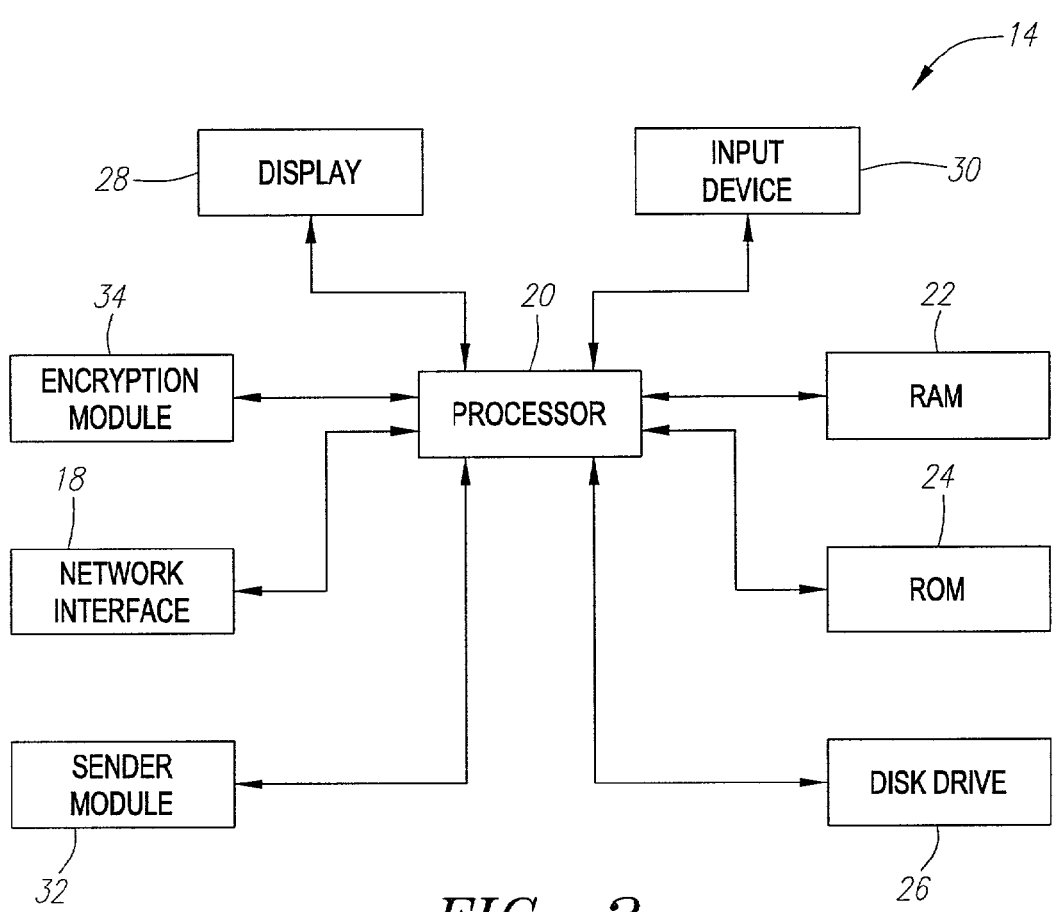
FIG. 2 is a block diagram representation of an embodiment of a peripheral device in accordance with the present invention.

FIG. 2 is a simplified block diagram illustration of an embodiment of peripheral device 14. Peripheral device 14 can include a network interface 18 and control hardware and software interface for managing and printing the print jobs. The hardware can include a processor 20 and short-term RAM memory 22, in which programs are run and stored, respectively, for controlling the functions of peripheral device 14. Peripheral device 14 can also include long-term ROM memory 24 and a disk drive 26 for both short-term and short-term data storage. Peripheral device 14 can also include standard components, such as a manual paper input area, an output tray, and a paper bin. Peripheral device 14 can include a fixed or a non-fixed display 28, such as an LCD, and a user input device 30, such as an alphanumeric keyboard or touch screen with a keyboard emulator. Peripheral device 14 has user interface software stored in ROM memory 24 which is responsible for displaying information on display 28 and interpreting user inputs from the user input device 30. An exemplary peripheral device 14, can be one of many types of printers available from the Hewlett-Packard Corporation of Palo Alto, Calif. An exemplary list of printers, may include HP LJ8150 and HP LJ4550.

Referring again to FIG. 2, in one embodiment, peripheral device 14 can include a sender module 32. In this embodiment, sender module 32 is capable of receiving a digital data file, converting the digital file, for example, to a PDF or TIFF file, and transmitting the file as an e-mail attachment to a preselected recipient (i.e. host computer or peripheral device). Sender module 32 can be embedded and integrated into peripheral device 14 or may be a stand-alone module operably coupled to peripheral device 14. Examples of the use of digital sender technology are found in HP Digital Sender 8100C and 9100C available commercially from Hewlett-Packard Corporation, Palo Alto, Calif.

In accordance with another embodiment of the present invention, peripheral device 14 can include an encryption module 34. In this embodiment, print jobs transmitted over network 10 either locally or through Internet I, and received by peripheral device 14, can be encrypted using encryption module 34. Encryption module 34 serves to encode the print job while it is stored in ROM memory 24 waiting to be accessed or transmitted to a second host computer or other peripheral device in network 10 to prohibit unauthorized access to the print jobs. Any encryption technique may be used to take the plain text print job and convert it into cipher text. In one embodiment, the encryption technique may be either asymmetrical, such as public-key encryption or symmetrical, which uses the same key to encrypt and decrypt the print job. One exemplary technique for encoding or encrypting print jobs is known as Pretty Good Privacy (PGP). PGP is very effective, easy to use, and available for free from the official depository at the Massachusetts Institute of Technology. PGP is based on the asymmetrical or public-key method, which uses two keys. The first key is a public key that is disseminated to a sender from whom a recipient wishes to receive a print job and the second key is a private key used by the recipient to decrypt the encoded print job.

In yet another embodiment, the print job may be attached to an electronic message, such as an email. In this embodiment, to encrypt the print job a digital certificate can be used to verify that the sender is properly identified. The digital certificate also provides the recipient the means to send an encoded reply. For example, an individual wishing to send an encrypted print job applies for a digital certificate from a Certificate Authority (CA). The CA issues an encrypted digital certificate containing the applicant's public key and a variety of other identification information. The CA makes its own public key readily available through print publicity or perhaps on the Internet.

The recipient of an encrypted message uses the CA's public key to decode the digital certificate attached to the message, verifies it as issued by the CA and then obtains the sender's public key and identification information held within the certificate. With this information, the recipient can send an encrypted reply. The most widely used standard for digital certificates is X.509.

Figure 3:
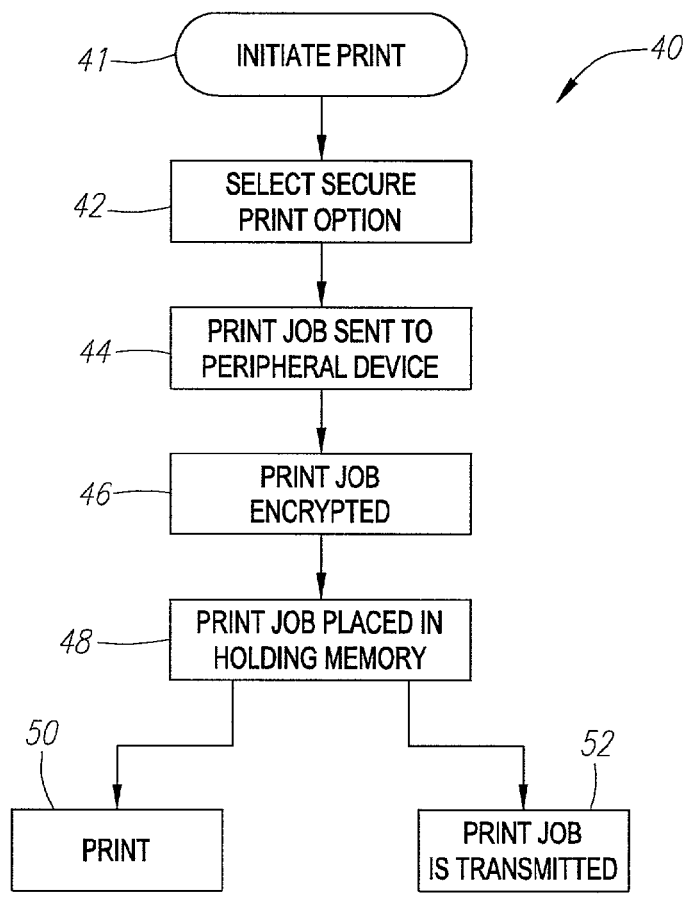
FIG. 3 is a flow diagram of a process in accordance with the present invention.

FIG. 3 is a flow chart of a process 40 for transmitting a print job in accordance with the present invention. Secure printing is established at each host computer 12, 15, and 17 (FIG. 2) in network 10 for all applications where printing is available, as an option, whenever the user initiates a print job (action 41) from his or her host computer 12, 15, and 17. In action 42, menu options are presented which include the choice of selecting secure printing. Thus, in accordance with menu options, the user may select a secure print job option. If such a selection has been made, the user is identified, for example, by the user inputting his or her identity in the form of a name or pseudonym. Optionally, the identity of the user may be read from the user's host computer, where the host computer is presumed to be assigned to a single user. Alternatively, if the user must sign onto the host computer when beginning a work session, the user's identity, as a name or pseudonym, may be taken from the host computer directly. In some embodiments, the user may enter a personal identification number (PIN), which becomes associated with the specific secure print job to be sent to the printer. In action 44, the secure print job is sent to peripheral device 14 (FIG. 2), together with the information as to sender identity and the PIN associated with the print job.

In action 46, peripheral device 14 accepts the secure print job and directs the plain text to encryption module 34 where the plain text is converted to cipher text. Peripheral device 14 places the now encrypted print job in a holding memory or buffer, for example in RAM memory 22 or on disk drive 26. Peripheral device 14 can continue to process other jobs until such time as the sender uses panel display 28 and buttons 30 to identify him or herself via manual input (e.g., inputting his or her name or pseudonym via input device 30).

Peripheral device 14 compares the identification obtained from host computer 12 with that manually input by the sender, including the PIN associated with the buffered secure print job. Once peripheral device 14 verifies a match, the secure print job can be stored (action 48) or printed (action 50). In the alternative, the secure print job may be transmitted from peripheral device 14 to another host computer or another peripheral device in network 10 (action 52).

Alternatively, in action 46, peripheral device 14 accepts a print job and places the print job in a holding memory or buffer, for example in RAM memory 22 or on disk drive 26. Peripheral device 14 can continue to process other jobs until such time as the sender uses panel display 28 and buttons 30 to identify him or herself via manual input. Peripheral device 14 compares the identification obtained from host computer 12 with that manually input by the sender, including the PIN associated with the buffered print job. In one embodiment, once peripheral device 14 verifies a match, the sender can input an instruction via panel display 28 and buttons 30 to peripheral device 14. In this embodiment, the instruction directs peripheral device 14 to direct the plain text of the buffered print job to encryption module 34, where the plain text is converted to cipher text. The now encrypted print job can be stored on peripheral device 14 (action 48), printed (action 50), and/or transmitted from peripheral device 14 to another host computer or another peripheral device in network 10 (action 52).

Figure 4:
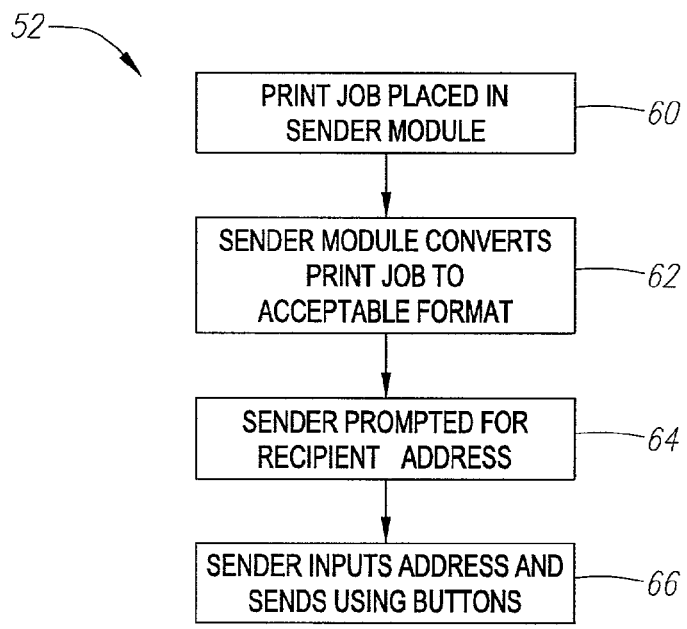
FIG. 4 is a flow diagram of an embodiment of the process of FIG. 3.

FIG. 4 is a flow diagram of the actions associated with transmitting the secure print job in action 52. In action 60, the secure and encrypted print job is removed in its encrypted form from the buffer and placed into sender module 32. In action 62, sender module 32 converts the encrypted print job to an acceptable format, such as a PDF or TIFF file. In action 64, the sender is prompted at display 28, to manually input a recipient's address, such as an IP address, IP subnet, IP gateway, or SMTP server address. The recipient's address may be a host computer or other peripheral device, such as a file server, a printer, a fax machine, a copy machine and the like. Optionally, peripheral device 14 may have a database of addresses from which the sender can select for transmitting the secure print job.

In action 66, the sender inputs (or optionally selects) one or more addresses at display 28 and hits a "send" button on input device 30. Sender module 34 transmits the secure print job over the LAN, via the Internet, or via an email system to the recipient. The recipient uses keys to decrypt the print job and may either print the data or further transmit the secure print job to yet another host computer or peripheral device in network 10.

Although exemplary embodiments of the present invention have been shown and described, it will be apparent to those having ordinary skill in the art that a number of changes, modifications, or alterations to the invention as described herein may be made, none of which depart from the scope of the present invention. All such changes, modifications and alterations should therefore be seen as being within the scope of the present invention.

What is claimed is:

1. A printing system comprising:
   a first peripheral device comprising:
      a processor for receiving a data stream through a network;
      an encryption module for converting said data stream from plain text to cipher text;
      memory for storing the cipher text until access to said cipher text by a user is authorized;
      a printing mechanism for printing a hardcopy document corresponding to the cipher text; and
   a sender module for transmitting said cipher text through said network to a preselected recipient as an attachment to an email message.

2. The system of claim 1, wherein said data stream comprises text and graphics.

3. The system of claim 1, wherein said encryption module comprises the pretty good privacy (PGP) encrypting technique.

4. The system of claim 1, wherein said sender module converts said cipher text into a PDF or TIFF file and transmits said PDF or TIFF file to said preselected recipient.

5. The system of claim 1, further comprising:
   a manual input device operative to receive an input from a user such that, if a user provides an input to the manual input device indicating that the user is an authorized user, the cipher text stored in the memory can be accessed.

* * * * *